United States Patent Office 3,636,065
Patented Jan. 18, 1972

3,636,065
WATER-INSOLUBLE ANTHRAQUINONE
DYESTUFFS
Jéan-Fredéric Guye-Vuillème, Basel, Switzerland, assignor to Ciba Limited, Basel, Switzerland
No Drawing. Filed June 12, 1968, Ser. No. 736,249
Claims priority, application Switzerland, June 21, 1967, 8,817/67
Int. Cl. C09b 1/50
U.S. Cl. 260—376         6 Claims

ABSTRACT OF THE DISCLOSURE 1,5 - dihydroxy - 4,8 - diamino - 2 - phenyl-anthraquinones carrying in p-position at the phenyl residue an acyloxy group of a sulfur- or nitrogen-containing carbonic acid derivative.

The present invention provides water-insoluble anthraquinone dyestuffs of the formula

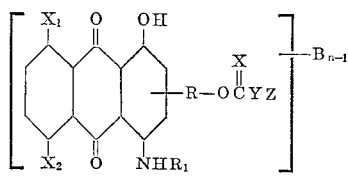

and mixtures of such dyestuffs, in which formula $X_1$ represents a nitro or hydroxyl group or preferably a residue of the formula —$NHR_2$, $X_2$ represents a residue of the formula —$NHR_3$ or preferably a hydroxyl group, $R_1$, $R_2$ and $R_3$ each represents a hydrogen atom or an alkyl residue, R represents an arylene residue, X represents a sulphur atom or preferably an oxygen atom, Y represents a sulphur atom or a residue of the formula —$NR_1$—, Z represents an alkyl, aralkyl or aromatic residue, B represents a halogen atom and $n$ is an integer not greater than 5, but preferably 2 or 3.

The present invention provides a process for preparing dyestuffs of the above general formula, which comprises acylating an anthraquinone compound of the formula

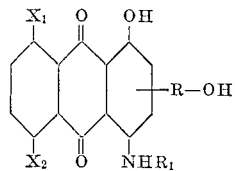

in which R, $X_1$, $X_2$ and $R_1$ have the meanings given above, by the addition of a reactive carbonic acid derivative containing sulphur or nitrogen and then, if necessary, halogenating and alkylating.

Suitable arylene residues represented by R are mainly phenylene residues that may carry hydroxyl and especially alkyl or alkoxy residues. The residue represented by Z may also carry further substituents, for example, hydroxyl, acyloxy or nitro groups or it may be unsaturated.

The residues $R_1$, $R_2$ and $R_3$ may each represent a hydrogen atom or an alkyl residue that may be substitued, for example, by hydroxy, alkoxy, acyloxy or aryl groups.

The following hydroxyanthraquinones are given as examples of anthraquinone compounds that may be used as starting materials:

1-amino - 4,5,8 - triamino-2- or 3(4'-hydroxyphenyl)-anthraquinone and especially the following dihydroxyanthraquinones:

1,5-dihydroxy-4,8-diamino-2- or -3-(4'-hydroxyphenyl)-anthraquinone,
1,5-dihydroxy-4,8-diamino-2- or -3-(4'-hydroxy-3'-methylphenyl)-anthraquinone,
1,5-dihydroxy-4,8-diamino-2- or -3-(4'-hydroxy-2'-methylphenyl)-anthraquinone,
1,5-dihydroxy-4,8-diamino-2- or -3-(2'-hydroxy-5'-methylphenyl)-anthraquinone,
1,5-dihydroxy-4,8-diamino-2- or -3-(2'-hydroxy-5'-ethylphenyl)-anthraquinone,
1,5-dihydroxy-4,8-diamino-2- or -3-(4'-hydroxy-3'-amylphenyl)-anthraquinone,
1,5-dihydroxy-4,8-diamino-2- or -3-(2'-hydroxy-5'-amylphenyl)-anthraquinone,
1,5-dihydroxy-4,8-diamino-2- or -3-(2'-hydroxy-5'-octylphenyl)-anthraquinone,
1,5-dihydroxy-4,8-diamino-2- or -3-(2'-hydroxy-5'-cyclohexylphenyl)-anthraquinone,
1,5-dihydroxy-4,8-diamino-2- or -3-(4'-hydroxy-3'-phenylphenyl)-anthraquinone,
1,5-dihydroxy-4,8-diamino-2- or -3-(2'-hydroxy-5'-phenylphenyl)-anthraquinone,
1,5-dihydroxy-4,8-diamino-2- or -3-(4'-hydroxy-3',5'-dimethylphenyl)-anthraquinone,
1,5-dihydroxy-4,8-diamino-2- or -3-(4'-hydroxy-3'-methoxyphenyl)-anthraquinone,
1,5-dihydroxy-4,8-diamino-2- or -3-(3',4'-dihydroxyphenyl)-anthraquinone,
1,5-dihydroxy-4,8-diamino-2- or -3-(2',4'-dihydroxyphenyl)-anthraquinone,
1,5-dihydroxy-4,8-diamino-2- or -3-(2',5'-dihydroxyphenyl)-anthraquinone,
1,5-dihydroxy-4,8-diamino-2- or -3-(2',4',6'-trihydroxyphenyl)-anthraquinone,
1,5-dihydroxy-4,8-diamino-2- or -3-(2'-hydroxynaphthyl-1')-anthraquinone,
1,5-dihydroxy-4,8-diamino-2- or -3-(4'-hydroxynaphthyl-1')-anthraquinone,
1,5-dihydroxy-4-amino-8-methylamino-2- or -3-(4'-hydroxyphenyl)-anthraquinone,
1,5-dihydroxy-4,8-dimethylamino-2- or -3-(4'-hydroxyphenyl)-anthraquinone,
1,5-dihydroxy-4-amino-8-hydroxyethylamino-2- or -3-(4'-hydroxyphenyl)-anthraquinone and
1,5-dihydroxy-4-amino-8-benzoyloxyethylamino-2- or -3-(4'-hydroxyphenyl)-anthraquinone.

The compounds used as starting materials may be obtained, for example, by additively combining a hydroxy or alkoxy benzene with a boric acid ester of 1,5-dihydroxy-4,8 - diamino-anthraquinone - 2,6 - disulphonic acid dissolved in concentrated sulphuric acid, boiling the addition product in an acidic aqueous solution or heating it to a temperature within the range of from 20 to 60° C. in an alkaline solution to split off a sulphonic acid group, and eliminating the sulphonic acid group still present by reduction. If necessary, the 1,5 - dihydroxy - 4,8 - diamino - 2 - phenyl-anthraquinones so obtained may be alkylated at the α-amino group. Suitable alkylating agents are, for example, ethylene bromide, ethylene chloride, ethylene chlorohydrin, epichlorohydrin, benzyl chloride and also alkylsulphonic acid esters, for example, paratoluenesulphonic acid methylester, alkyl sulphates, for example, dimethyl sulphate or diethyl sulphate, aldehydes, especially formaldehyde, and alkylene oxides, for example, ethylene oxide, care being taken to ensure that the phenolic hydroxyl group is not alkylated. Compounds in which the aryl residue is bound in 3-position may be obtained by treatment of 1,5-dihydroxy - 4,8 - dinitro-anthraquinone with hydroxy- or alkoxy-benzenes in the presence of sulfuric and boric acid and subsequent reduction of the 5- and 8-nitro groups. When halogenated anthraquinones are to be prepared, acylation and halogenation may be carried out in any desired sequence; if necessary, alkylation may be carried out afterwards.

Halogenating agents suitable for use in the reaction in accordance with the invention are, for example, the free halogens, for example, chlorine or especially bromine, or substances that yield halogen, for example, sulphuryl chloride or phosphorus pentachloride. Halogenation is advantageously carried out in the presence of one of the catalysts normally used in halogenation processes, for example, iodine or a ferric halide.

The reaction in accordance with the invention is advantageously carried out by heating in an inert organic solvent, for example, nitrobenzene, a halogenobenzene or dimethylformamide.

The following are given as examples of reactive carbonic acid derivatives suitable for use in the acylation process in accordance with the invention:

$ClCOSC_2H_5$ $ClCONHC_2H_5$ $ClCOSCH_2CH_2Cl$ $ClCONHCH_2CH_2Cl$ $ClCOSCH_2CH_2OCH_3$ $ClCONHCH_2CH_2OCH_3$ $ClCOSCH_2CH_2OCH$ $ClCONHCH_2CH_2OOCCH_3$ $ClCOSC_6H_5$ $ClCONHC_6H_5$ $ClCOSC_6H_4OCH_3$ $ClCONHC_6H_5OCH_3$ $ClCOSC_6H_4Cl$ $ClCONHC_6H_4Cl$ $ClCOSC_6H_4NO_2$ $ClCONHC_6H_4NO_2$

The corresponding bromine derivatives may also be used. Further carbonic acid derivatives are as follows: alkyl- and aryl-isocyanates and also heterocyclic isocyanates, for example, methylisocyanate,
ethylisocyanate,
n-propylisocyanate,
n-butylisocyanate,
octylisocyanate,
methylisocyanatoacetate,
butyl-isocyanatoacetate,
cyclohexylisocyanate,
phenyl-isocyanate, para-tolylisocyanate,
ortho-, meta- and para-chlorophenylisocyanate,
meta- and para-nitrophenylisocyanate,
2,5-dichlorophenylisocyanate,
ortho- and para-methoxyphenylisocyanate,
2-naphthylisocyanate,
2-biphenylylisocyanate,
2-isocyanatotetrahydropyran,
tetrahydrofurfurylisocyanate,
3-isocyanato-pyridine,
2-furylisocyanate,
3-isocyanato-N-ethylcarbazole and preferably isocyanates of heterocycles containing sulphur, for example, 2-carbomethoxy-3-isocyanatothiophene,
2-isocyanato-3-cyanothiophene,
2-isocyanato-3-carbomethoxy-4-methylthiophene,
2-isocyanato-5-methylthiophene-3-carboxylic acid amide,
2-isocyanato-3-carbomethoxy-3,4-dimethylthiophene,
2-isocyanato-3-carboethoxy-3,4-tetramethylenethiophene
and 3-isocyanatosulpholan;

furthermore, isothiocyanates of the formula $$Z\!-\!N\!=\!C\!=\!S$$

for example, ethylisothiocyanate, n-butylisothiocyanate and phenylisothiocyanate.

During acylation, it is especially advantageous to add a small amount of an organic base, for example, aniline, methylaniline or pyridine. Mixed reactive carbonic acid derivatives may also be used, in which case mixtures of dyestuffs are formed. The subsequent alkylation process that may be necessary is carried out by a method known per se with an alkyl halide, an alkylsulphonic acid ester, for example, dimethyl sulphate, an aldehyde, for example, formaldehyde.

The new acylated aminoanthraquinone compounds and the mixtures thereof are valuable dyestuffs. They are suitable for dyeing a very wide variety of materials. Those products which are insoluble in organic solvents may be used as pigments. Those dyestuffs that are soluble in organic solvents, for example, esters and especially alcohol and acetone, may be used for colouring natural and synthetic resins, waxes, lacquers and plastics compositions, for example, prepared from cellulose ethers or esters; for example, they may be used for the spin-coloration of secondary acetate rayon and also for colouring natural and synthetic polymers and condensation products. In particular, they display excellent affinity for polyester fibres, especially polyethylene terephthalate fibres, and dye these fibres pure blue to greenish or reddish blue shades possessing excellent fastness to light and sublimation. The new dyestuffs also have good building-up properties and reserve well on wool and cotton.

For dyeing, the new dyestuffs are advantageously used in a finely divided form, and dyeing is carried out in the presence of a dispersing agent, for example, soap, sulphite cellulose waste liquor or a synthetic detergent, or a combination of different wetting and dispersing agents. Prior to dyeing, it is generally advantageous to convert the dyestuff into a dyeing preparation which contains a dispersing agent and the dyestuff in a form such that a fine dispersion is obtained when the preparation is diluted with water. Such dyestuff preparations may be obtained in known manner, for example, by reprecipitating the dyestuff from sulphuric acid and grinding the suspension so obtained with sulphite cellulose waste liquor. If necessary, they may also be obtained by grinding the dyestuff in a highly efficient grinding device in the dry or wet state in the presence or absence of a dispersing agent.

The new dyestuffs are suitable for application by the so-called thermofixation process in which the material to be dyed is impregnated at a temperature not exceeding 60° C. with an aqueous dispersion of the dyestuff which advantageously contains 1 to 50% of urea and thickening agent, especially sodium alginate, and then squeezed in the usual manner. The impregnated material is advantageously squeezed so as to retain 50 to 100% of its dry weight of dye-liquor. To fix the dyestuff, the material so impregnated is heated to a temperature above 100° C., for example, to a temperature within the range of from 180 to 220° C., advantageously after drying, for example, in a current of warm air.

The aforementioned thermofixation process is specially suitable for the dyeing of union fabrics made from polyester fibres and cellulosic fibres, especially cotton. In this case, in addition to the dyestuffs of the invention, the padding liquor contains dyestuffs suitable for dyeing cotton, especially vat dyestuffs or reactive dyestuffs, that is to say, dyestuffs capable of being fixed on the cellulosic fibre with formation of a chemical bond, for example, dyestuffs which contain a chlorotriazine or chlorodiazine residue. In the latter case, it is generally advantageous to add an agent capable of binding acid to the padding liquor, for example, an alkali metal carbonate, an alkali metal phosphate, an alkali metal borate or an alkali metal perborate, or mixtures thereof. When using vat dyestuffs the padded fabric must be treated after the heat treatment with an aqueous alkaline solution of one of the reducing agents commonly used in vat dyeing.

The dyeings obtained are advantageously subjected to an after-treatment, for example, by heating with an aqueous solution of a non-ionic detergent.

The dyestuffs may also be applied by printing processes. In this method of application a printing paste is used which contains, for example, in addition to the usual printing adjuvants, for example, thickening and wetting agents, the finely divided dyestuff, if necessary, in admixture with one of the above-mentioned cotton dyestuffs, if necessary, together with urea and/or an agent capable of binding acid.

The following examples illustrate the invention. Unless otherwise stated, the parts and percentages are by weight.

EXAMPLE 1

8 parts of 1,5-dihydroxy-4,8-diamino-2-(4'-hydroxy)-phenylanthraquinone and 0.1 part of ferric bromide are added to 72 parts of nitrobenzene and the batch is heated to 80° C. while stirring. 5 parts of bromine are added dropwise within 15 minutes and stirring is continued for 2 hours at the same temperature. A powerful stream of dry air is then conducted through the batch until no more hydrogen bromide escapes and then the batch is cooled to 50° C. 8 parts of pyridine are added and then 4.75 parts of ethylisocyanate are added dropwise. The batch is stirred for 15 minutes at 50° C., 2 parts by volume of dimethyl sulphate are added dropwise and the batch is heated for 30 minutes at 100° C. The reaction mixture is then subjected to steam distillation and the powder which precipitates is isolated by filtration, washed and dried.

10.9 parts of a blue dyestuff are obtained which dyes polyethylene terephthalate fibres a pure blue shade possessing very good fastness to light and sublimation. It also reserves well on wool and cotton and possesses excellent building-up properties.

Dyeing procedure 1 part of the dyestuff mixture obtained in the manner described in Example 1 is ground wet with 2 parts of a 50% aqueous solution of the sodium salt of dinaphthyl-methane disulphonic acid and the batch is dried.

The dyestuff preparation so obtained is mixed with 40 parts of a 10% aqueous solution of the sodium salt of N-benzyl-μ-heptadecylbenzimidazole disulphonic acid and then 4 parts of a 40% acetic acid solution are added. A dyebath of 400 parts is prepared therefrom by dilution with water.

100 parts of cleaned polyester fibre material are entered into this bath at 50° C., the temperature is raised to 120 to 130° C. within half an hour and dyeing is carried out for one hour at that temperature in a closed vessel. The material is then well rinsed. A greenish blue dyeing possessing excellent fastness to light and sublimation is obtained. The dyestuff reserves well on wool and cotton.

EXAMPLE 2

12.7 parts of a dyestuff which dyes polyethylene terephthalate fibres a greenish blue shade having the same good properties of fastness are obtained by replacing the ethylisocyanate used in Example 1 with the same amount of phenylisocyanate.

EXAMPLE 3

13.1 parts of a greenish blue dyestuff containing 8% of sulphur which dyes polyethylene terephthalate fibres a greenish blue shade having the same good properties of fastness are obtained by replacing the ethylisocyanate used in Example 1 with 7.55 parts of the compound of the formula $$Cl-CO-S-C_6H_5$$

EXAMPLE 4

8 parts of 1,5-dihydroxy-4,8-diamino-2-(4'-hydroxy)-phenyl-anthraquinone and 0.1 part of ferric bromide are added to 72 parts of nitrobenzene and the batch is heated to 80° C. while stirring. 5 parts of bromine are added dropwise within 15 minutes and stirring is continued for 2 hours at the same temperature. A powerful stream of dry air is then passed through the batch until no more hydrogen bromide escapes and then the batch is cooled to 50° C. 8 parts of pyridine are added, 4.75 parts of ethylisocyanate are added dropwise and the batch is stirred at 50° C. for 15 minutes. The reaction mixture is then subjected to steam distillation and the powder which precipitates is isolated by filtration, washed and dried.

10.8 parts of a blue dyestuff of the formula

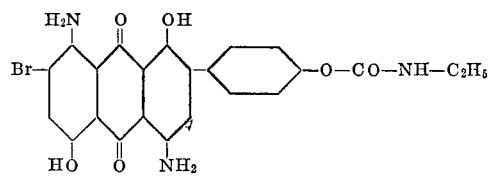

are obtained which dyes polyethylene terephthalate fibres a blue shade possessing good fastness to light and sublimation and which reserves well on wool and cotton.

EXAMPLE 5

12.6 parts of a dyestuff powder which dyes polyethylene terephthalate fibres a blue shade having properties similar to those described in Example 4, and which corresponds to the formula

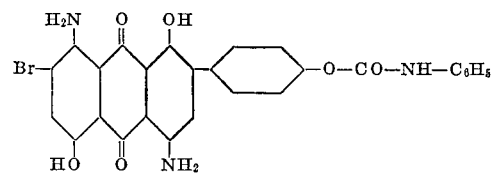

may be obtained by replacing the ethylisocyanate used in Example 4 with the same amount of phenylisocyanate.

EXAMPLE 6

13 parts of a dyestuff powder which dyes polyethylene terephthalate fibres a blue shade having properties similar to those described in Example 4, and which corresponds to the formula

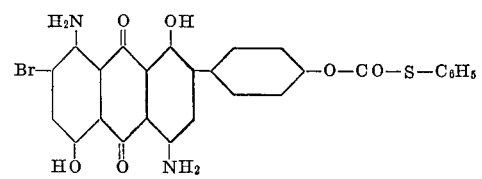

may be obtained by replacing the ethylisocyanate used in Example 4 with 7.55 parts of the compound of the formula

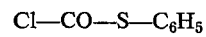

$$Cl-CO-S-C_6H_5$$

What is claimed is:

1. A water-insoluble anthraquinone dyestuff of the formula

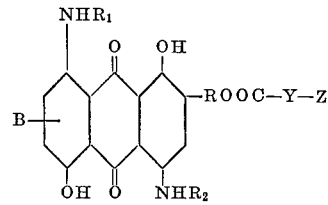

wherein B is hydrogen, bromo or chloro, $R_2$ is hydrogen or methyl, $R_1$ is hydrogen, methyl, ethyl, hydroxyethyl or benzoyloxyethyl, R is phenylene, naphthylene or phenylene substituted by $C_{1-8}$-alkyl, phenyl, cyclohexyl, methoxy, or hydroxy, Y is —NH— or —S—, Z is $C_{1-8}$ alkyl, ethyl substituted by acetoxy, chloro or methoxy, phenyl, phenyl substituted by Cl, $NO_2$, methyl or methoxy.

2. A water-insoluble antraquinone dyestuff of the formula

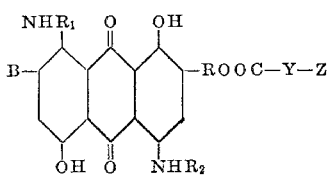

wherein B is hydrogen, bromo or chloro, $R_2$ is hydrogen or methyl, $R_1$ is hydrogen, methyl, ethyl, hydroxyethyl or benzoyloxyethyl, R is phenylene, naphthylene or phenylene substituted by $C_{1-8}$-alkyl, phenyl, cyclohexyl, methoxy, or hydroxy, Y is —NH— or —S—, Z is $C_{1-8}$ alkyl, ethyl substituted by acetoxy, chloro or methoxy, phenyl, phenyl substituted by Cl, $NO_2$, methyl or methoxy.

3. A dyestuff according to claim 2 of the formula

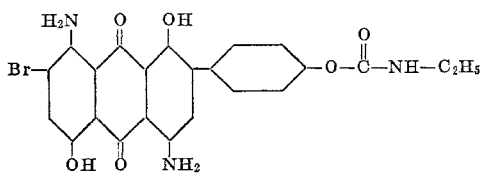

4. A dyestuff according to claim 2 of the formula

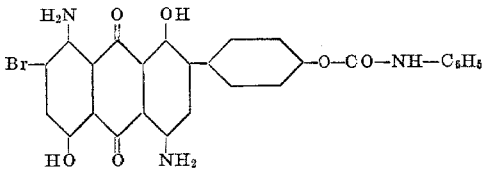

5. A dyestuff according to claim 2 of the formula

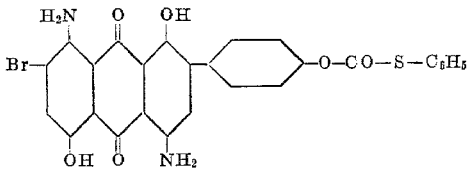

6. A dyestuff according to claim 2 of the formula

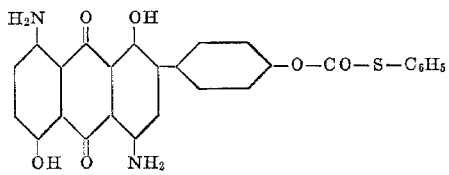

References Cited
UNITED STATES PATENTS 3,349,104   10/1967   Lodge _____ 260—377
3,379,738   4/1968    Wallace et al. _____ 260—377

LORRAINE A. WEINBERGER, Primary Examiner

E. J. SKELLY, Assistant Examiner

U.S. Cl. X.R.

8—4, 6, 39, 40; 260—272, 316, 329.2 A, 345.8, 347.4, 377, 380